(12) United States Patent
Sawazaki et al.

(10) Patent No.: US 7,965,398 B2
(45) Date of Patent: Jun. 21, 2011

(54) CHARACTER RENDERING DEVICE, DISPLAY DEVICE, AND PRINTING DEVICE

(75) Inventors: Takashi Sawazaki, Chofu (JP); Yoshiyuki Ono, Hino (JP); Akira Saito, Sagamihara (JP)

(73) Assignee: Seiko Epson Corporation, Tokyo (JP)

( * ) Notice: Subject to any disclaimer, the term of this patent is extended or adjusted under 35 U.S.C. 154(b) by 873 days.

(21) Appl. No.: 11/987,380

(22) Filed: Nov. 29, 2007

(65) Prior Publication Data

US 2008/0198165 A1    Aug. 21, 2008

(30) Foreign Application Priority Data

Feb. 15, 2007    (JP) .................. 2007-035340

(51) Int. Cl.
*G06F 15/00* (2006.01)
*G06F 15/16* (2006.01)

(52) U.S. Cl. ...................... 358/1.11; 345/503

(58) Field of Classification Search ................ 358/1.11, 358/1.12, 1.13, 1.14, 1.15; 399/27, 60, 72, 399/20, 401; 345/502, 503, 501, 538, 558, 345/443, 522, 470, 468
See application file for complete search history.

(56) References Cited

U.S. PATENT DOCUMENTS

| 5,757,384 | A | 5/1998 | Ikeda et al. |
| 6,867,872 | B1 | 3/2005 | Kurihara et al. |
| 2003/0001850 | A1* | 1/2003 | Katsura et al. ............ 345/503 |

FOREIGN PATENT DOCUMENTS

| JP | A-4-373087 | 12/1992 |
| JP | A-5-11733 | 1/1993 |
| JP | U 5-90563 | 12/1993 |
| JP | A-9-68963 | 3/1997 |
| JP | A-9-325747 | 12/1997 |
| JP | A-11-20273 | 1/1999 |
| JP | A-2006-284980 | 10/2006 |

OTHER PUBLICATIONS

Shao Lejun et al.; "A New Contour Fill Algorithm for Outlined Character Image Generation;" *Comput. & Graphics*; vol. 19; No. 4; 1995; pp. 551-556.

* cited by examiner

*Primary Examiner* — Saeid Ebrahimi Dehkordy
(74) *Attorney, Agent, or Firm* — Oliff & Berridge, PLC (57) ABSTRACT

There is disclosed a character rendering device capable of rendering characters at a higher speed. The character rendering device includes an internal storage unit including plural storage areas; a first bus connected through an external bus to an external storage unit storing character shape data sets, each expressing a shape of a character; a second bus connected to the internal storage unit; a controller that specifies one of the plural storage areas; a first rendering unit connected to the first and second buses, that renders a character shape of a character based on one of the character shape data sets supplied through the external bus and the first bus, and writes through the second bus the rendered character shape into one of the storage areas specified by the controller; a second rendering unit connected to the second bus, reads through the second bus, each time when writing of a character shape into one of the plural storage areas is completed by the first rendering unit, the character shape from one of the plural storage areas, and renders a character based on the read character shape; and a transfer unit that transfers the character rendered by the second rendering unit.

12 Claims, 7 Drawing Sheets

| CONTROL POINT NUMBER | CONTROL POINT TYPE | POSITION |
|---|---|---|
| 1 | ON-CURVE | $(x1,y1)$ |
| 2 | ON-CURVE | $(x2,y2)$ |
| 3 | OFF-CURVE | $(x3,y3)$ |
| 4 | ON-CURVE | $(x4,y4)$ |
| ⋮ | ⋮ | ⋮ |
| 12 | ON-CURVE | $(x12,y12)$ |
| TOTAL NUMBER OF CONTOURS | | 2 |
| CONTROL POINT NUMBERS OF END POINTS | | 7,12 |

CHARACTER RENDERING DEVICE, DISPLAY DEVICE, AND PRINTING DEVICE

The entire disclosures of Japanese Patent Applications No. 2007-035340 filed on Feb. 15, 2007 is expressly incorporated by reference herein.

BACKGROUND

1. Technical Field

The present invention relates to a technique for rendering characters.

2. Related Art

Font data expressing a shape of a character is used to render the character to be presented on a display screen or to be printed on a paper sheet. Font data can be roughly divided into three types, e.g., a bitmap type, outline type, and stroke type. For example, in case of drawing a character using font data of the outline type, there are required three processing steps which are: "contour drawing" for rendering contours (character shape) of a character; "fill-in painting" for rendering the inside of the contours; and "transferring" for transferring bitmap data of the character which is generated by the fill-in painting. A technique for executing these processing steps in parallel and to carry out these processing steps at a high speed is known. For example, JP-UM-A-5-090583 discloses a technique by which a dedicated module performs the "contour drawing" and "fill-in painting" while a CPU (Central Processing Unit) performs the "transferring".

According to the technique described in the above publication, a large amount of data is read by the CPU while the CPU performs the "transferring". Therefore, most of the buses connected to the CPU are occupied by data being transferred. If any module attempts the "contour drawing" and "fill-in painting" during the "transferring", data required for the "contour drawing" and "fill-in painting" cannot be supplied to the bus. This gives rise to a problem that an increase in the speed of processing cannot be achieved.

SUMMARY

The invention has an object of rendering characters at a higher speed.

According to an aspect of the invention, there is provided a character rendering device comprising: an internal storage unit including plural storage areas; a first bus connected through an external bus to an external storage unit storing one or more character shape data sets, each of the one or more character shape data sets expressing a shape of a character; a second bus connected to the internal storage unit; a controller that specifies one of the plural storage areas; a first rendering unit connected to the first and second buses, that renders a character shape of a character on a basis of one of the one or more character shape data sets, that is supplied through the external bus and the first bus, and writes through the second bus the rendered character shape into one of the plural storage areas specified by the controller; a second rendering unit connected to the second bus, reads through the second bus, each time when writing of a character shape into one of the plural storage areas is completed by the first rendering unit, the character shape from one of the plural storage areas, and renders a character on a basis of the read character shape; and a transfer unit that transfers the character rendered by the second rendering unit. The character rendering device as described above is capable of rendering characters at a higher speed.

The character rendering device described above can alternatively be configured so that the one or more character shape data sets are one or more outline font data sets, the first rendering unit renders, as a character shape of a character, one or more contours forming a character on a basis of one of the one or more outline font data sets, and the second rendering unit reads one or more contours forming a character from one of the plural storage areas, and renders the character by painting one or more areas surrounded by the read one or more contours. In this configuration, compatibility can be achieved with the format of font data of a commonly used outline type.

Also, the character rendering device described above can alternatively be configured so that the one or more character shape data sets are one or more stroke font data sets, the first rendering unit renders, as a character shape of a character, one or more center lines of one or more strokes forming a character on a basis of one of the one or more stroke font data sets, and the second rendering unit reads one or more center lines one or more strokes forming a character from one of the plural storage areas, and renders the character by painting areas extending width-wise across the read one or more center lines. In this configuration, compatibility can be achieved with the format of font data of a commonly used stroke type.

Also, the character rendering device described above can alternatively be configured so that the one or more character shape data sets are one or more font data sets, each of the one or more font data sets expressing a shape of an entirety or a part of a character. In this configuration, even a character having a large size can be rendered.

According to another aspect of the invention, there is provided a display device including: any of the character rendering devices described above; and a display unit that displays the character transferred by the transfer unit. The display device as described above is capable of displaying rendered characters on a display screen.

According to still another aspect of the invention, there is provided a printing device including: any of the character rendering devices described above; and a printing unit that prints the characters transferred by the transfer unit. The printing device as described above is capable of printing rendered characters on a paper sheet or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention will now be described below.

(1) Structure of the Embodiment

Figure 1:
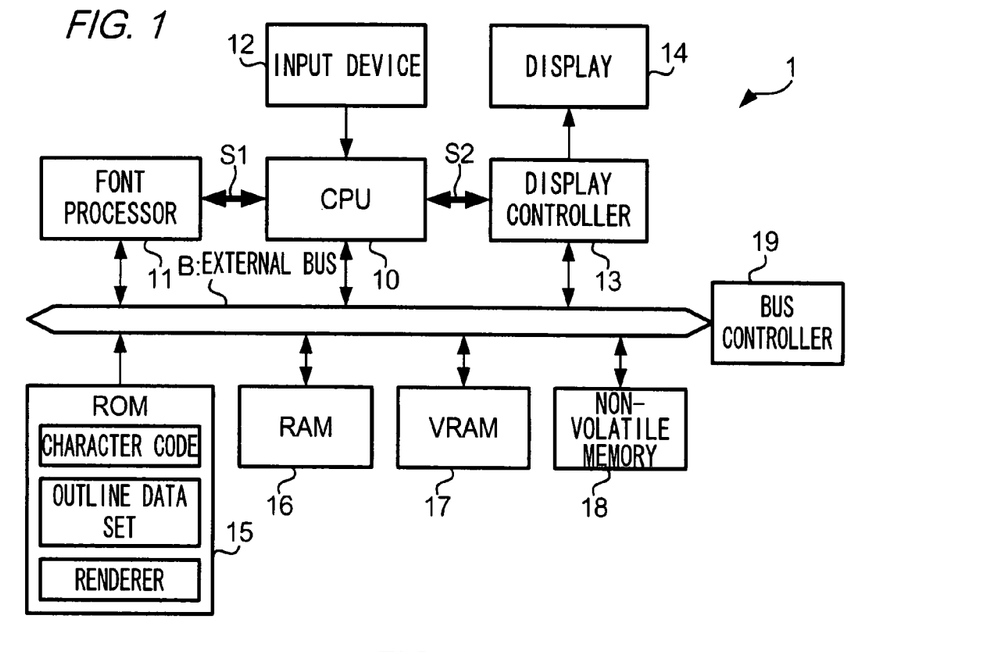
FIG. 1 shows a hardware structure of an image display device according to an exemplary embodiment of the invention.

FIG. 1 shows a hardware structure of an image display device 1.

As shown in the figure, the image display device 1 includes a CPU 10, font processor 11, input device 12, display controller 13, display 14, ROM (Read Only Memory) 15, RAM (Random Access Memory) 16, VRAM (Video Random Access Memory) 17, non-volatile memory 18, and bus controller 19.

The CPU 10 reads a control program stored in the ROM 15 and develops the program in the RAM 16. The CPU 10 executes processing steps in accordance with a procedure written in the control program. The ROM 15 stores font data (character shape data) of an outline type (hereinafter referred to as "outline data sets") and character codes related to the font data. The ROM 15 also stores an OS (Operating System) executed by the CPU 10, and a renderer which is a program for displaying characters on the display 14 on the basis of outline data sets. The input device 12 is an operation unit operated by users, and includes operation devices, such as a keyboard, mouse, pen device, and joy stick. As a user operates the input device 12, the input device 12 supplies the CPU 10 with a signal corresponding to the operation made by the user.

The CPU 10 reads an outline data set from the ROM 15 on the basis of the signal input from the input device 12, and transfers the outline data set to the font processor 11. The font processor 11 interprets the outline data set, converts the outline data set into image data of the bitmap format, and writes the image data into the VRAM 17. The VRAM 17 can be configured to be included as a part of the RAM 16. The image data written into the VRAM 17 is then supplied to the display controller 13 in accordance with an instruction from the CPU 10. The display controller 13 controls the display 14 to present an image on a display screen. The display 14 is a display unit utilizing cholesteric liquid crystal or electrophoresis, and has memory which allows an image to be kept continuously displayed even when power supply stops. The non-volatile memory 18 is a non-volatile storage means such as a flash memory or hard disk. The bus controller 19 performs control so that plural modules connected inside may not simultaneously be accessed.

A signal line S1 connects the CPU 10 to the font processor 11. Through the signal line S1, a command (character rendering command) for instructing the font processor 11 to start rendering of a character is supplied to the font processor 11, as well as a signal (completion notification signal) for notifying of completion of rendering of the character is supplied to the CPU 10 from the font processor 11. A signal line S2 connects the CPU 10 to the display controller 13. The CPU 10 instructs the display controller 13 to drive and refresh the display 14, for example, at the time of refreshing an image through the signal line S2. If the display 14 does not have memory, the display controller 13 itself can drive the display controller 13, and so, the signal line S2 is therefore omissible.

When the image display device 1 is powered on, each module is then reset. The CPU 10 then starts a boot program stored in the ROM 15, so that the OS starts up. The CPU 10 thereafter performs processing steps based on the program, and starts a "character rendering processing" and the like for drawing characters in accordance with instructions from a user.

Figure 2:
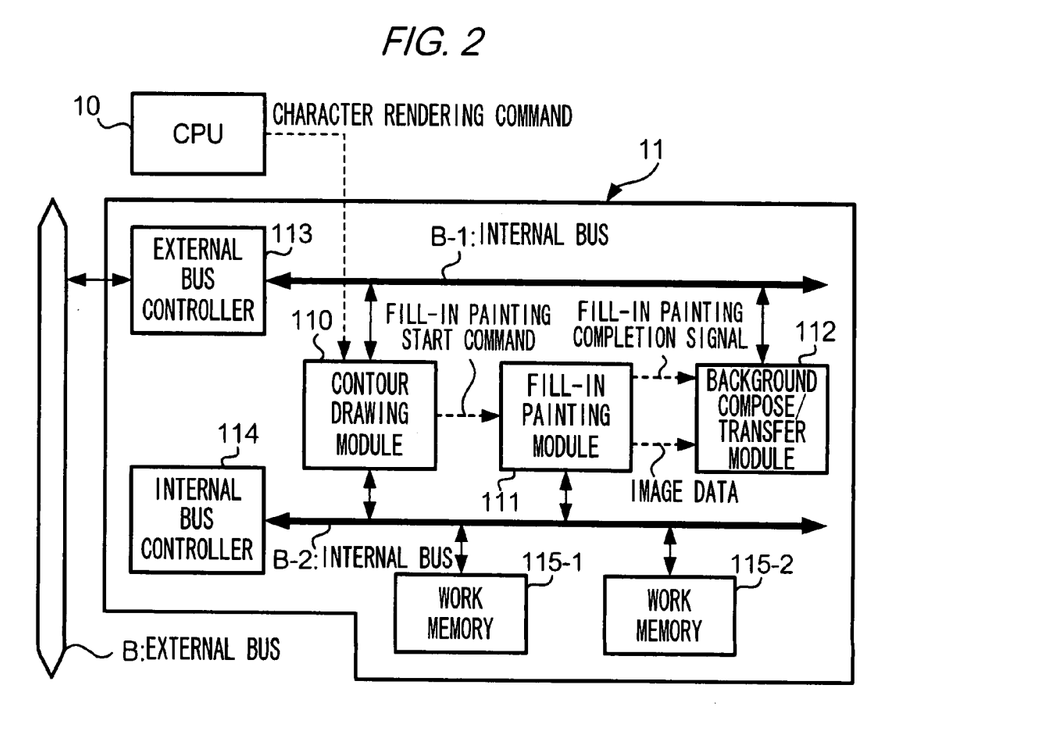
FIG. 2 shows a hardware structure of a font processor.

Next, FIG. 2 shows a hardware structure of the font processor 11.

As shown in the figure, the font processor 11 includes a contour drawing module 110, fill-in painting module 111, background composite/transfer module 112, external bus controller 113, internal bus controller 114, and work memory 115. The work memory 115 is an internal storage unit in the font processor 11 having plural storage areas, and is connected to an internal bus B-2. The work memory 115 is logically divided into work memories 115-1 and 115-2, and has a structure which allows independent access from other modules. In the description below, work memories 115-1 and 115-2 will be referred to commonly as a "work memory 115" except in a case where the work memories 115-1 and 115-2 need to be particularly distinguished from each other.

(1-1) Contour Drawing of Characters

The contour drawing module 110 as a first rendering unit is connected to internal buses B-1 and B-2. The contour drawing module 110 generates image data (hereinafter "contour data") of a bitmap type expressing contours of a character (or renders contours), based on an outline data set supplied from the ROM 15 which is an external storage unit outside the font processor 11, via the internal bus B-1 and an external bus B. The contour drawing module 110 writes a rendering result into the work memory 115 via the internal bus B-2. The processing carried out by the contour drawing module 110 to generate contour data will now be described more specifically. In the following description, outline data sets called TTF (True Type Font) are used.

Figure 3:
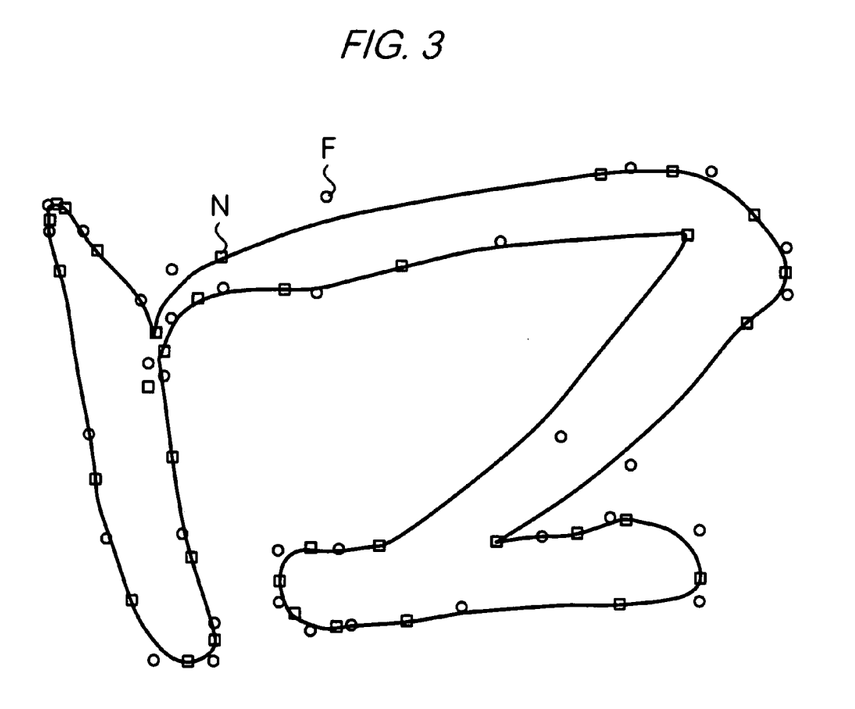
FIG. 3 illustrates an example of an image displayed by the image display device, including control points according to TTF.

FIG. 3 shows a (Chinese) character "□" using TTF. Square and circle marks are located along or around the contour of the character. Both, square and circle marks will be referred to as "control point". The square marks denote on-curve control points (or simply on-curve points), and the circle marks denote off-curve control points (or simply off-curve points). The same denotation applies also to later figures. In case of TTF, the shape of one character is expressed by one or plural "contours". A contour refers to a closed figure expressed by connecting lines and/or quadratic Bezier curves. The closed figure depicts an outline of a character. For example, if two on-curve control points continue, the two adjacent control points are connected by a line. Otherwise, if an off-curve control point appears, two on-curve control points adjacent to the off-curve control point are connected by a quadratic Bezier curve. If two off-curve control points appear adjacent to each other, an on-curve control point can be supplementally added in the middle between the two off-curve control points, which can then be connected by a quadratic Bezier curve.

Figure 4:
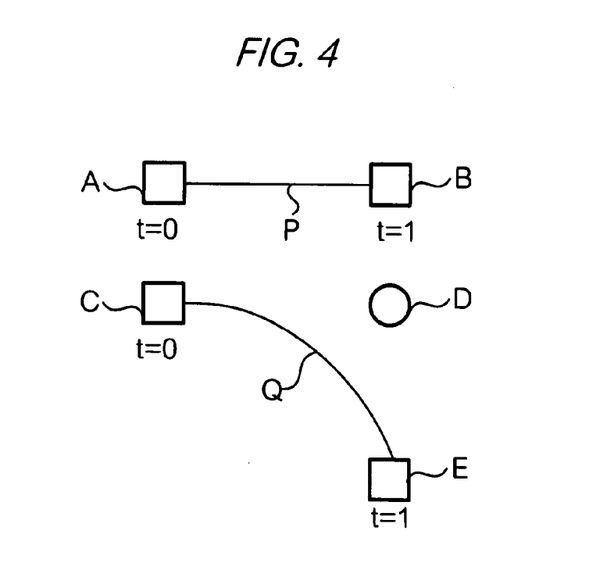
FIG. 4 illustrates contours connecting control points.

There is now supposed, for example, control points A, B, C, and E which are on-curve control points, and a control point D which is an off-curve control point, as shown in FIG. 4. A line A-B and a quadratic Bezier curve C-D-E are respectively represented as a set of points P (line) and a set of point Q (quadratic Bezier curve) which are defined by the following expressions:

$$P = (1-t)A + tB$$

$$Q=(1-t)^2C+2t(1-t)D+t^2E$$

In the above expressions, t is a parameter which continuously varies within a range of 0<=t<=1. If t=0 is given with respect to the line A-B, the point P is identical to the point A. If t=1 is given, the point P is identical to the point B. In a similar manner, if t=0 is given with respect to the quadratic Bezier curve C-D-E, the point Q is identical to the point C. If t=1 is given, the point Q is identical to the point E.

Figure 5:
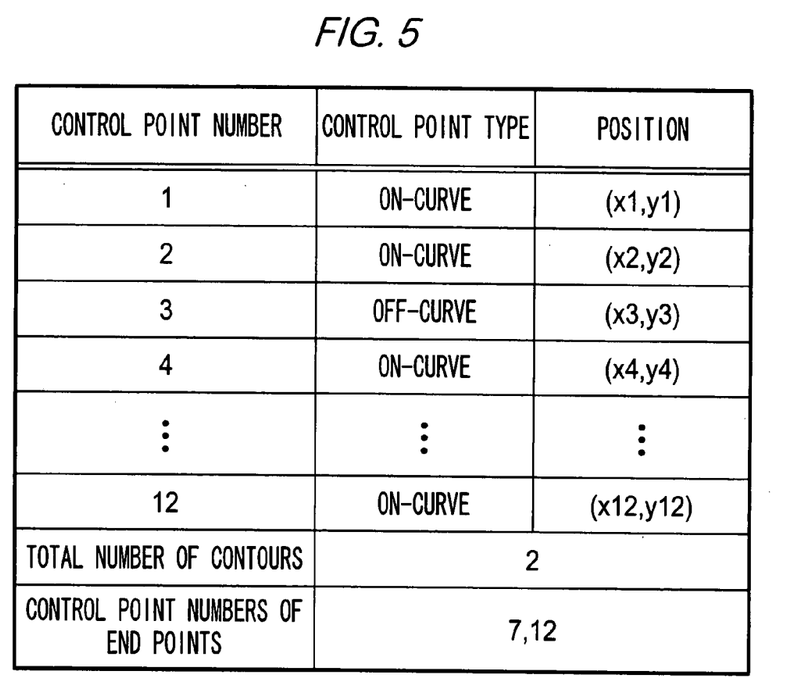
FIG. 5 is a table explaining a data structure of an outline data set including control points according to TTF.

FIG. 5 shows an example of an outline data set expressing one character.

Figure 6:
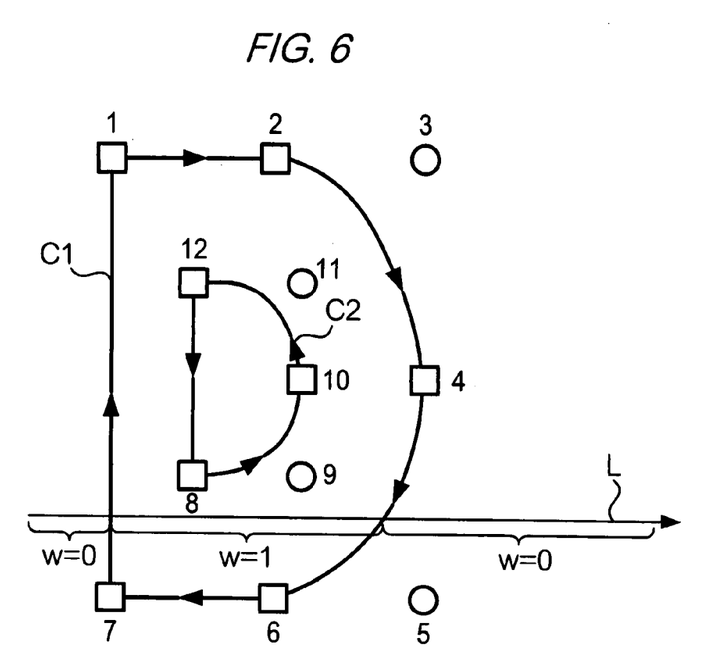
FIG. 6 illustrates contours connecting control points.

As shown in FIG. 5, the outline data set is constituted of: "control point numbers" assigned to control points in the ascending order; types of control points (each indicating either an on-curve control point or an off-curve control point); and a set of "positions" (X and Y coordinates) of control points on a plane. Such an outline data set expresses contours of one character. Further, each outline data set is related to a total number of contours included in the outline data set, and control point numbers assigned to end points of the contours. For example, as shown in FIG. 6, outlines of an alphabet character "D" are expressed by two contours c1 and c2. The total number of contours is therefore "2" as shown in FIG. 5. For the contour c1, the control point number expressing an end point of the contour is "7". For the contour c2, the control point number expressing an end point of the contour is "12". Accordingly, the control point numbers designating end points of contours are "7 and 12", as shown in FIG. 5.

As described above, the contour drawing module 110 interprets an outline data set, calculates contours, and generates bitmap image data expressing the calculated contours, thereby to render outlines of a character. Further, the contour drawing module 110 writes bitmap image data as contour data into the work memory 115.

(1-2) Character Rendering by Fill-in Painting

After contour data is written into as described above, the fill-in painting module 111 reads the contour data rendered on the work memory 115, via the internal bus B-2, and renders a character based on the read contour data. More specifically, the fill-in painting module 111 generates image data expressing areas which are surrounded by contours expressed by the contour data and are filled with colored pixel. That is, the fill-in painting module 111 renders a character formed by painting areas surrounded by contours.

Processing steps executed by the fill-in painting module 111 will now be described specifically.

The fill-in painting module 111 reads contour data written into the work memory 115, and scans the contour data in a constant direction (normally in the horizontal direction), to obtain points where scanning lines and contours intersect each other. At this time, the fill-in painting module 111 holds a given parameter w (whose initial value is 0). The fill-in painting module 111 determines whether each contour drawn in a direction from a smaller control point number to a greater control point number intersects upwardly or downwardly a scanning line. If the determination results in that a contour upwardly intersects a scanning line, 1 is added to the parameter w; if not, 1 is subtracted from the parameter w. As shown in FIG. 6, a scanning line L is divided into several segments by the contours c1 and c2. However, the fill-in painting module 111 does not perform any processing steps on a segment for which w=0 is given. On a segment for which the parameter w is 1, the fill-in painting module 111 locates (or fills) colored pixels (that is, the segment is painted in a color). While filling colored pixels for each scanning line in this manner, the fill-in painting module 111 outputs sequentially, image data to the background composite/transfer module 112.

Figure 7:
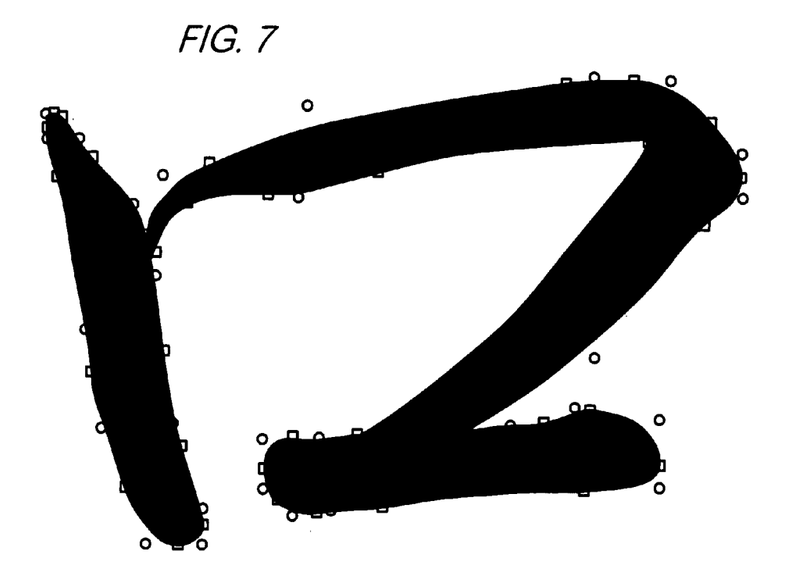
FIG. 7 illustrates how outlines are formed by contours and are painted inside.

According to the rules described above, the fill-in painting module 111 paints the inside of contours drawn in accordance with control points arranged as shown in FIG. 3. Then, an image "□" is rendered as shown in FIG. 7. Though this figure shows on-curve control points and off-curve control points, these points are shown merely supplementally to help understand the embodiment, and do not appear in an actual rendered image.

(1-3) Transfer of Characters

Subsequently, the background composite/transfer module 112 generates image data in which image data supplied from the fill-in painting module 111 is composed with a predetermined background image. That is, the background composite/transfer module 112 reads image data expressing a background image written into the VRAM 17, via the internal bus B-1, and renders characters on the background image. At this time, the background composite/transfer module 112 reads image data corresponding to the background image over which characters are to be rendered. Further, the background composite/transfer module 112 writes the image data into an area in the VRAM 17 which corresponds to a display position on the display screen of the display 14. The background composite/transfer module 112 then outputs a completion notification signal to the CPU 10 via the internal bus B-1. In response to this completion notification signal, the CPU 10 transfers the image data written into the VRAM 17 to the display controller 13.

The external bus controller 113 performs control so that the contour drawing module 110 and the background composite/transfer module 112 connected via the internal bus B-1 may not be accessed simultaneously, and exchange of data may be allowed between the external bus and the internal bus B-1. The internal bus controller 114 performs control so that the work memory 115 may not be accessed simultaneously from both the contour drawing module 110 and the fill-in painting module 111.

(2) Operation of the Embodiment

Next, operation of the embodiment will be described. In the following description, it is supposed that the CPU 10 instructs the font processor 11 to render a character "D" in the character rendering processing for a first character.

Figure 8:
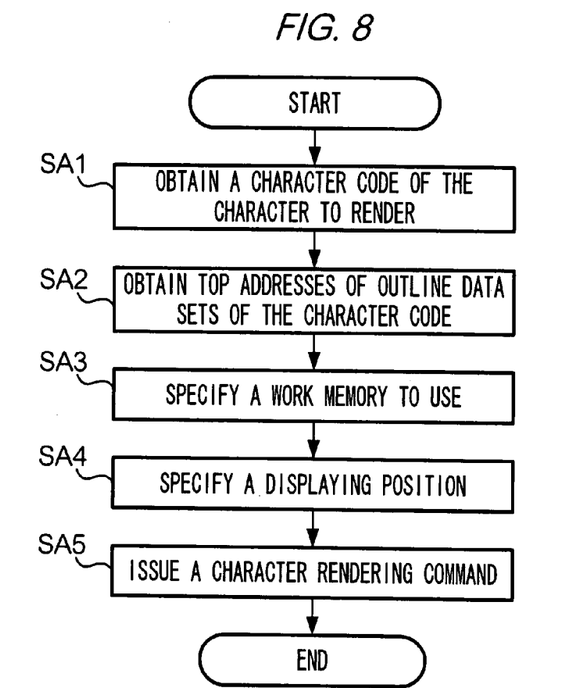
FIG. 8 is a flowchart showing a procedure executed by a CPU.

FIG. 8 is a flowchart showing an operation procedure until the CPU 10 of the image display device 1 supplies a character rendering command for the font processor 11.

A user uses the input device 12 to specify the character "D" and to give an instruction to display the character. As instructed, the CPU 10 starts the processing shown in FIG. 8. The CPU 10 firstly obtains a character code corresponding to the character specified by the user from the ROM 15 (step SA1). The character code is desirably a shifted JIS code or an ASCII code which are well known in Japan. Next, the CPU 10 obtains top addresses of storage areas each of which stores an outline data set of a predetermined size required for drawing the character "D" (step SA2). The contour drawing module 110 of the font processor 11 renders contours in a manner as follows. That is, the contour drawing module 110 obtains a top address of storage area which stores an outline data set of the predetermined size which is to be processed, reads the outline data set from the storage area identified by the obtained top address, generates contour data following the read outline data set, and writes the generated contour data into the work memory 115. The contour drawing module 110 repeats the process with regard to each of outline data sets of the predetermined size required for drawing a character, and draw contours of the character. Accordingly, the CPU 10 obtains top addresses of storage areas each of which stores an outline data set of the predetermined size for drawing a character, and provides contour drawing module 110 with the obtained top addresses. For example, provided that the predetermined size is equivalent to four control points in FIG. 5, the CPU 10 obtains top addresses of storage areas storing outline data sets which are related to control point numbers 1 to 4, control point numbers 5 to 8, and control point numbers 9 to 12, respectively.

Subsequently, the CPU 10 specifies one of the work memories 115-1 and 115-2 which should be used by the font processor 11 in the present character rendering processing (step SA3). How the CPU 10 operates to specify the one work memory in the step SA3 will be described in detail later. Next, the CPU 10 specifies a display position on the display screen of the display 14 where the character should be displayed (step SA4). The CPU 10 further issues a "character rendering command" including the top addresses of outline data sets, the specified one work memory, and the display position, which have been obtained through the steps SA2 to SA4. The CPU 10 supplies the character rendering command to the font processor 11 (step SA5). For example, while a document creation program is executed, the CPU 10 executes the processing steps SA1 to SA5 as described above each time when a user specifies a character by the input device 12.

Thus, the CPU 10 supplies a character rendering command to the font processor 11 to start the character rendering processing.

Described next will be how the CPU 10 operates to specify a work area to be used by the font processor 11, in the above step SA3 shown in FIG. 8.

Figure 9:
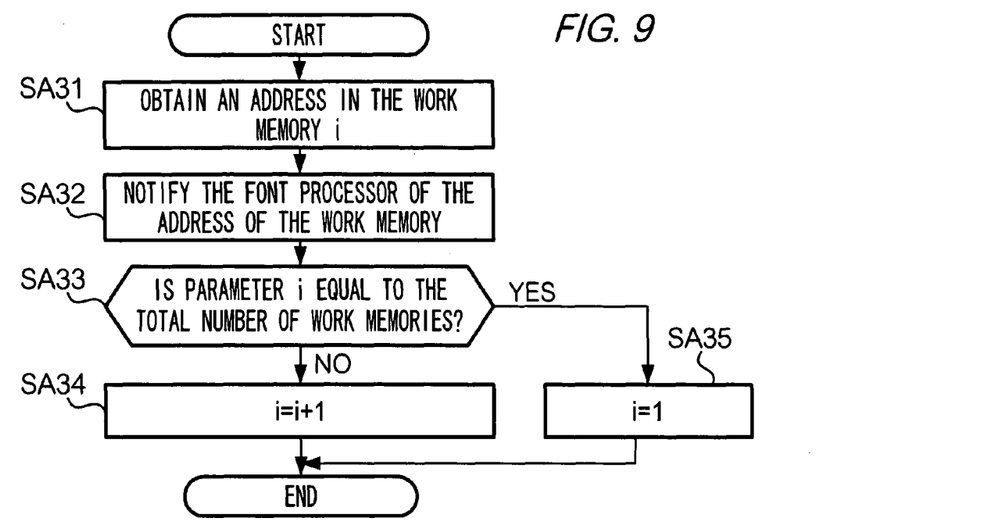
FIG. 9 is a flowchart showing another procedure executed by the CPU.

FIG. 9 is a flowchart showing an operation procedure taken by the CPU 10 to specify a work area to be used by the font processor 11.

In FIG. 9, the CPU 10 firstly obtains an address in the work memory 115-$i$ (where i=1 or 2) to be used as a work area (step SA31). The initial value of the parameter i is 1. According to the character rendering command for the first character, the CPU 10 obtains an address at which contour data should be written in the work memory 115-1. Next, the CPU 10 notifies the font processor 11 of the address in the work memory 115-$i$ obtained in the step SA31 (step SA32). The CPU 10 then determines whether the parameter i is equal to the total number of work memories or not (step SA33). Since the font processor 11 has two work memories 115-1 and 115-2 in this embodiment, the CPU 10 determines whether the parameter i is "2" or not. Now that i=1 is given, the CPU 10 determines that the parameter i is not equal to the total number of work memories (step SA33: NO). The CPU 10 then increments the parameter i by one. Namely, the CPU 10 sets the parameter i=i+1 (step SA34). Accordingly, the parameter i=2 is attained.

Subsequently, the CPU 10 is instructed to render a second character and once again executes the processing steps SA31 to SA33. At this time, the parameter i=2 has already been given in the step SA31, and therefore, the CPU 10 obtains an address in the work memory 115-2 at which contour data should be written. The CPU 10 notifies the font processor 11 of the address, in the step SA32. In the step SA33, the CPU 10 determines that the parameter i is equal to 2 as the total number of work memories (step SA33: YES). The CPU 10 returns the parameter i to the initial value "1" (step SA35).

When the CPU 10 is next instructed to render a third character, an address in the work memory 115-1 is then obtained in the step SA31. Therefore, the CPU 10 performs the same processing as in a previous case of giving an instruction to render the first character.

In this manner, the CPU 10 specifies work memories to be used by the font processor 11. Specifically, the parameter i varies in order of 1, 2, 1, 2, 1, 2 . . . That is, the CPU 10 notifies the font processor 11 of an address alternately selected from the work memories 115-1 and 115-2 each time the CPU 10 is newly instructed to render a character.

Next, contour drawing which the contour drawing module 110 carries out will be described.

Figure 10:
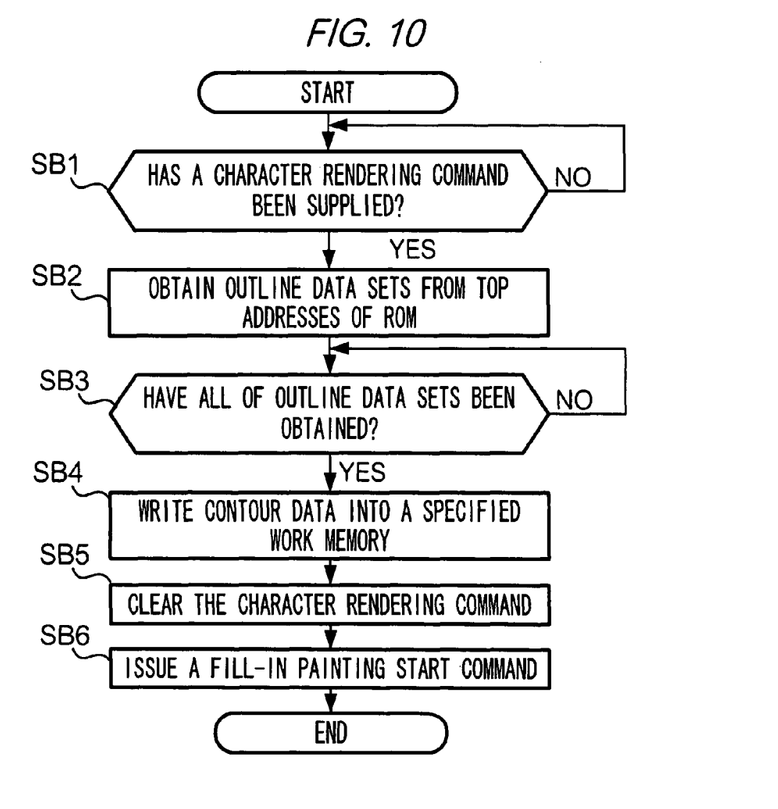
FIG. 10 is a flowchart showing a procedure executed by a contour drawing module.

FIG. 10 is a flowchart showing a procedure for contour drawing which the contour drawing module 110 carries out.

In FIG. 10, the contour drawing module 110 of the font processor 111 stands by until a character rendering command is given from the CPU 10. Upon reception of a character rendering command for a first character (step SB1: YES), the contour drawing module 110 stores the command into a register not shown. Further, the contour drawing module 110 obtains outline data sets of the predetermined size, based on top addresses in the ROM 15 at which outline data sets related to the character code of the character "D" are stored (step SB2). Subsequently, the contour drawing module 110 determines whether all outline data sets required for writing contour data have been obtained or not (step SB3). If all outline data sets have not yet been obtained completely (step SB3: NO), the contour drawing module 110 continues obtaining outline data sets. Otherwise, if the contour drawing module 110 has completed obtaining of all required outline data sets (step SB3: YES), the contour drawing module 110 generates contour data based on types and positions of control points corresponding to control point numbers as shown in FIG. 5, and writes the generated contour data into the specified work memory 115-1 (step SB4). In this manner, the contour drawing module 110 obtains outline data sets of the predetermined size, and writes contour data into the work memory 115. Upon completion of writing of contour data by the character rendering processing for the first character, the contour drawing module 110 clears the character rendering command for the first character which is stored in the register (step SB5). Further, the contour drawing module 110 issues a "fill-in painting start command" to start painting the inside of the contour, and outputs the command to the fill-in painting module 111 (step SB6).

Subsequently, a character rendering command for a second character is supplied. The contour drawing module 110 then performs the same processing as described above, regarding the work memory 115-2 as a work area which is specified by the CPU 10.

Next, the fill-in painting module 111 renders a character, based on the contour data written into the work memory 115. To render a character, the fill-in painting module 111 paints areas surrounded by contours, by fill-in painting which will now be described below.

Figure 11:
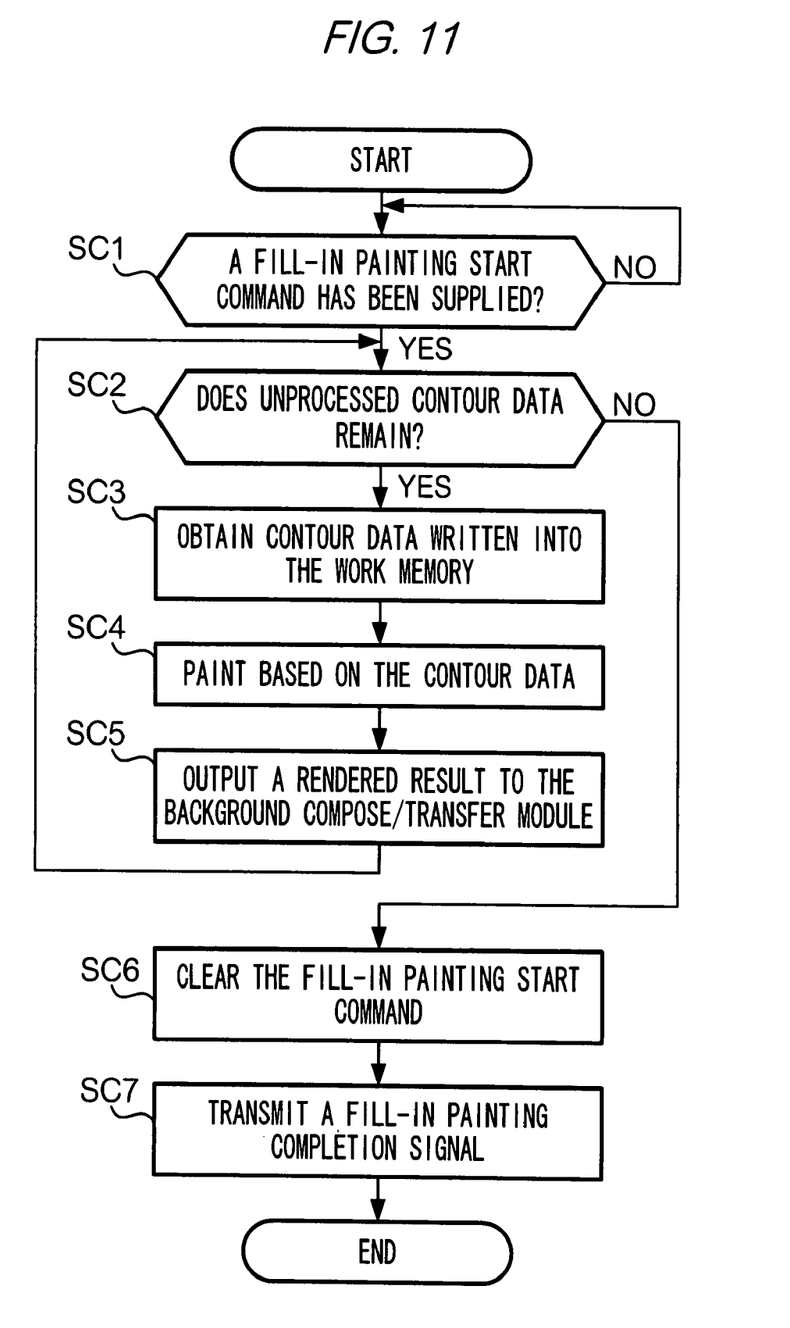
FIG. 11 is a flowchart showing a procedure executed by a fill-in painting module.

FIG. 11 is a flowchart showing an operation procedure which the fill-in painting module 111 follows, in order to carry out fill-in painting on the basis of contour data generated by the contour drawing module 110.

In FIG. 11, the fill-in painting module 111 stands by until a fill-in painting start command is supplied during processing in response to a character rendering command for a first character. Upon supply of the fill-in painting start command (step SC1: YES), the fill-in painting module 111 stores the fill-in painting start command into a register not shown. The fill-in painting module 111 further determines whether contour data not subjected to fill-in painting still remains in the work memory 115-1 or not (step SC2). If the fill-in painting module 111 determines that contour data for which fill-in painting is incomplete, still remains (step SC2: YES), the fill-in painting module 111 reads (obtains) contour data of a predetermined size from contour data written into the work memory 115-1 (step SC3).

The fill-in painting module 111 paints areas of inside of contours indicated by the read contour data (step SC4), and generates image data. Upon completion of fill-in painting of the areas, the fill-in painting module 111 outputs the generated image data to the background composite/transfer module 112 (step SC5). Then, the fill-in painting module 111 returns to the step SC2 and determines whether there remains any other contour data for which fill-in painting is incomplete or not.

When fill-in painting is completed for all contour data related to the character rendering command for the first character and the fill-in painting module 111 determines that no unprocessed contour data remains any more in the work memory 115-1 (step SC2: NO), the fill-in painting module 111 clears the fill-in painting start commands stored in the register (step SC6). Then, the fill-in painting module 111 outputs a "fill-in painting completion signal" indicating completion of fill-in painting to the background composite/transfer module 112 (step SC7).

Described next will be how the background composite/transfer module 112 operates to compose a rendered character with a background image and give an instruction about transfer to the display 14.

Figure 12:
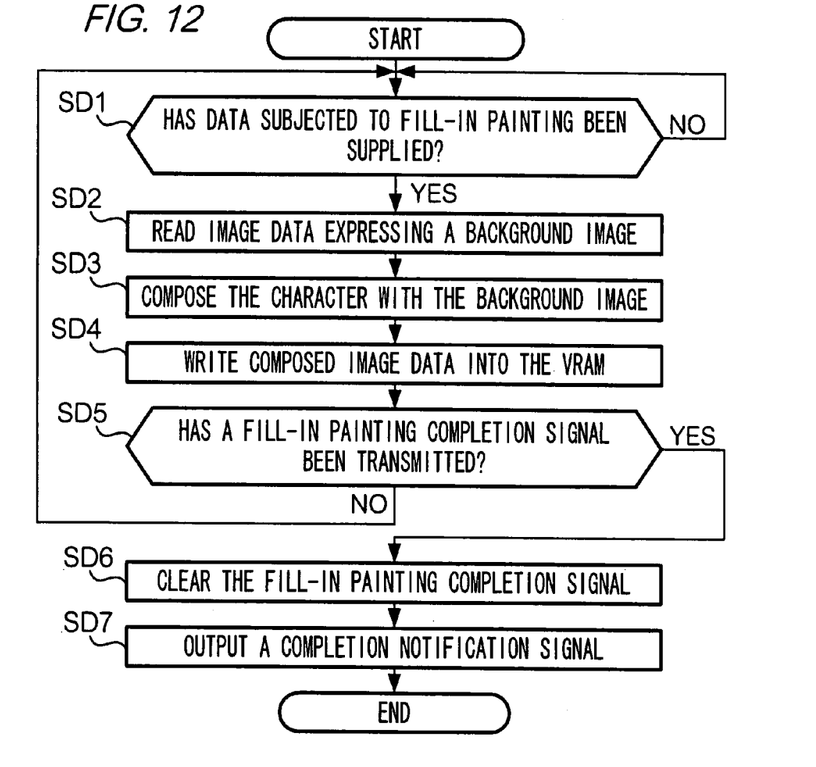
FIG. 12 is a flowchart executed by a background composite/transfer module.

FIG. 12 is a flowchart showing a processing procedure taken by the background composite/transfer module 112 from when the background composite/transfer module 112 composes an image subjected to fill-in painting with a background image until the background composite/transfer module 112 gives an instruction about transfer to the display 14. In FIG. 12, the background composite/transfer module 112 stands by until image data subjected to fill-in painting is supplied from the fill-in painting module 111. When the image data is supplied (step SD1: YES), the background composite/transfer module 112 then reads image data corresponding to a background image from the VRAM 17 (step SD2). Further, the background composite/transfer module 112 composes the image data expressing a character and the image data expressing a background image (step SD3). That is, in a composite image, the character is rendered at a specified display position on the background image. The background composite/transfer module 112 writes the image data generated in this manner, into an area corresponding to the display position in the VRAM (step SD4). Subsequently, the background composite/transfer module 112 determines whether a fill-in painting completion signal has been received or not (step SD5). If the background composite/transfer module 112 determines that no fill-in painting completion signal has been received (step SD5: NO), the background composite/transfer module 112 returns to the step SD1 and stands by until next image data is supplied. Otherwise, if the background composite/transfer module 112 determines that a fill-in painting completion signal has been received (step SD5: YES), the background composite/transfer module 112 clears the fill-in painting completion signal (step SD6) and outputs a completion notification signal to the CPU 10 (step SD7).

Upon reception of the completion notification signal, the CPU 10 transfers the image data written into the VRAM 17 to the display controller 13 and gives an instruction to display an image. In response to this instruction, the display controller 13 controls the display 14 to show an image expressed by the transferred image data.

Operation procedures taken by individual modules have been described above. Next description will be made in a chronographical order in which the modules carry out the processing steps.

Figure 13:
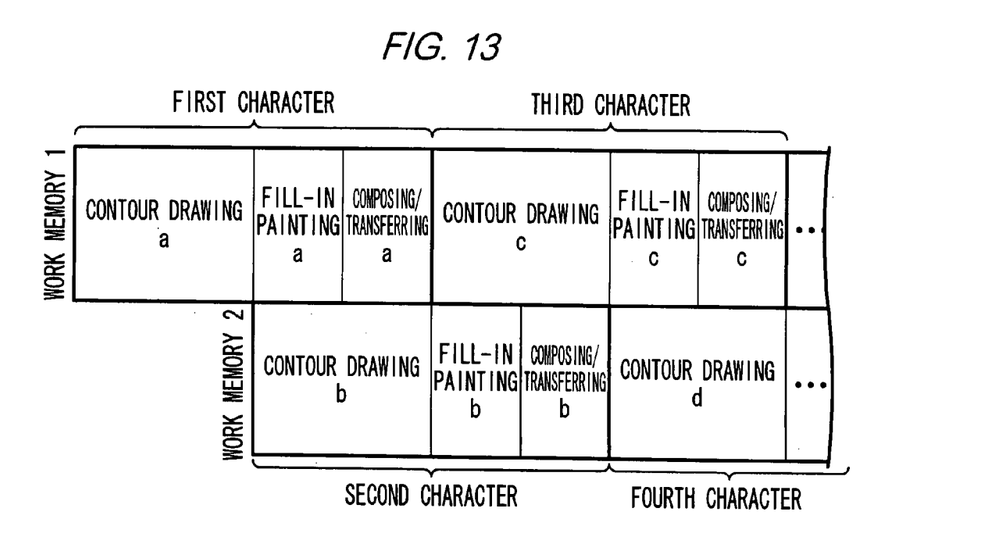
FIG. 13 is a chart chronographically showing order of processing steps executed by modules.

FIG. 13 shows chronographical order of processing steps executed by the modules which have been described referring to FIGS. 9 to 12. In FIG. 13, the work memory 115-1 is referred to as a "work memory 1", as well as the work memory 115-2 as a "work memory 2". The processing carried out by the contour drawing module 110 is referred to as "contour drawing". The processing carried out by the fill-in painting module 111 is referred to as "fill-in painting". The processing carried out by the background composite/transfer module 112 is referred to as "composing/transferring". An alphabetic suffix added to the end of each of the "contour drawing", "fill-in painting", and "composing/transferring" denotes a number of a character rendering command, which causes the processing. Specifically, the suffixes "a", "b", "c" and "d" denote processing steps caused in response to character rendering commands for first, second, third, and fourth characters, respectively.

At first, the contour drawing module 110 performs the contour drawing a in the character rendering processing for the first character, by using the work memory 115-1. After the contour drawing module 110 completes the contour drawing a, written contour data of the first character "D" stays in the work memory 115-1. Subsequently, the fill-inpainting module 111 reads the contour data written in the work memory 115-1, and starts the fill-in painting a. On the other hand, based on a character rendering command for a second character which is supplied to the font processor 11 the contour drawing module 110 starts the contour drawing b in the character rendering processing for the second character, by using the work memory 115-2. At this time, the fill-in painting module 111 reads contour data from the work memory 115-1 via the internal bus B-2, and the background composite/transfer module 112 writes image data into the VRAM 17 via the internal bus B-1. And in yet another instance, the contour drawing module 110 receives a character rendering command via an external bus, and writes contour data into the work memory 115-2 via the internal bus B-2. At this time, the internal bus controller 114 controls the contour drawing module 110 so that it is unable to access simultaneously both of the work memories 115-1 and 115-2 at one time. Similarly, the fill-in painting module 111 is also controlled so that it is unable to access simultaneously two work areas at one time. Therefore, the processing steps are carried out in parallel.

After completing all of the processing steps of the fill-in painting a, the fill-in painting module 111 next reads image data expressing a background image which is written in the VRAM 17. The fill-in painting module 111 further carries out the composing/transferring a; and writes composite image data again into the VRAM 17. Meanwhile, the contour drawing module 110 completes the contour drawing b in the character rendering processing for the second character by use of the work memory 115-2, and the fill-in painting module 111 starts the fill-in painting b. Then, the contour drawing module 110 starts the contour drawing c in the character rendering processing for a third character, by using the work memory 115-1. After completing the contour drawing c, the contour drawing module 110 starts, in a similar manner to that described above, the contour drawing d in the character rendering processing for a fourth character, by using the work memory 115-2.

As has been described above, either the work memory 115-1 or work memory 115-2 is specified for each of the contour data (i.e., for each new character rendering command). The contour drawing module 110, fill-in painting module 111, and background composite/transfer module 112 carry out the processing steps, using the work memory 115-1 or work memory 115-2 specified for each character rendering command. That is, while the contour drawing module 110 writes contour data into one of the work memory 115-1 or work memory 115-2 which is specified in relation to a character rendering command, the fill-in painting module 111 and background composite/transfer module 112 perform character rendering based on contour data written in the other one of the work memory 115-1 or work memory 115-2.

According to the embodiment described above, the font processor 11 has an internal bus B-1 for reading outline data sets, as well as an internal bus B-2 for writing/reading contour data into/from the work memory 115. Therefore, contour drawing, fill-in painting and composing/transferring can be executed in parallel, using respectively different internal buses. Accordingly, the character rendering processing can be achieved at a higher speed.

In addition, the contour drawing module 110 sequentially draws contour data based on outline data sets into the work memory 115-1 and work memory 115-2 respectively specified for the outline data sets. On the other hand, each time when the contour data of a character is written into one of the work memory 115-1 and work memory 115-2, the fill-in painting module 111 then reads the contour data from one of the work memory 115-1 and work memory 115-2, and renders the character based on the read contour data. In this manner, contour drawing and fill-in painting simultaneously progress in parallel using plural storage areas. As a result, the character rendering processing can be achieved at a higher speed.

(3) Modifications

The embodiment described above can be modified, for example, as follows.

In the above embodiment, the character rendering command is an instruction to render one predetermined character. As an alternative, the character rendering command can be an instruction to render only a part of one character. That is, contour data to be written into each of the work memory 115 expresses a contour (or contours) of part of one character. For example, there can be a case that an instruction is given to render a character "D" having a relatively large font size by a character rendering command for a first character. In this case, there is a possibility that all of the contour data related to the character "D" cannot be written together into the work memory 115. Then, the CPU 10 can issue a character rendering command for only an upper half area of the character "D", regarding the upper half area as a first character to be subjected to the character rendering processing, as well as another character rendering command for a lower half area of the character "D", regarding the lower half area as a second character to be subjected to the character rendering processing. According to this modification, a character can be rendered on the display 14 as large as the actual size of the character. Even if an instruction to render only one character is given to the CPU 10, the character rendering processing can be effectively achieved at a much higher speed.

In case of rendering one character through plural character rendering processing steps, the character can be rendered divided laterally into plural areas or divided into more areas than described above.

The above embodiment has been described referring to a case of rendering characters by using font data of an outline type. However, characters can be rendered by using font data of a stroke type. In case of stroke type font data, the shape of each character is specified by using center lines of strokes forming the character, and then, boldness (or width) of strokes is specified. Thus, also in this case, each character is rendered through plural processing steps. Therefore, the contour drawing module 110 and fill-in painting module 111 can respectively be replaced with a module for drawing center lines (expressing a character shape or a bone structure of a character) of strokes forming a character and a module for painting peripheries of the center lines. In this manner, the invention can be applied to the case of using stroke type font data.

Further, in case of rendering of a vector image, the image can be rendered by performing contour drawing, fill-in painting, special effects, and the like, based on parameters which represent coordinates of points and mathematical expressions for connecting the points to express lines, curves, and areas. Accordingly, the invention can be applied also to this case by providing modules which can respectively carry out such processing steps.

In the above embodiment, the fill-in painting module 111 and the background composite/transfer module 112 are respectively separate modules. However, one dedicated module capable of the same two functions as the fill-in painting module 111 and background composite/transfer module 112 can be substituted for these two modules. The background composite/transfer module 112 does not access the work memory 115 but performs processing steps based on image data supplied from the fill-in painting module 111. Therefore, the fill-in painting module 111 and the background composite/transfer module 112 can be integrated directly into one dedicated module.

The background composite/transfer module 112 can be modified so as to write image data supplied from the fill-in painting module 111 directly into the VRAM 17 without composing characters rendered by the fill-in painting module 111 with a background image.

The above embodiment has been described referring to a case of drawing characters on a display screen of the display 14. However, the invention can be configured to print an image on a recording paper sheet or the like. That is, the above embodiment is modified into a configuration in which the display controller 13 is replaced with a print controller, as well as the display 14 with a printing unit. The print controller controls the printing unit to print an image on a recording paper sheet. The printing unit prints an image on a recording paper sheet in accordance with a thermal transfer method, an inkjet method, or the like.

For example, image data equivalent to one image to be printed on one recording paper sheet is written into the VRAM 17, and a completion notification signal is supplied. The CPU 10 then transfers the image data written into the VRAM 17 further to the print controller and gives an instruction to print an image. In response to this instruction, the print controller controls the printing unit to print out the image (or characters) expressed by the transferred image data.

Also the above embodiment has been described referring to cases of rendering characters "□" and "D". However, characters to be rendered can be Japanese characters such as hiragana, katakana, and kanji (Chinese characters) and foreign characters such as Roman alphabets. Further, symbols such as "+" and "−" and figures and marks such as circles and polygons can be considered characters. That is, whatever contours the characters and the like have, the invention can be applied, insofar as font data of the characters and the like can be obtained and the characters and the like can be rendered based on the obtained font data.

In the above embodiment, the work memory 115 is configured so as to include two storage areas, e.g., the work memory 115-1 and work memory 115-2. However, the work memory 115 can be configured so as to include many more storage areas. According to this modification, even if the font processor includes many more dedicated modules, the modules can independently access the work memories, so that many more processing steps can be carried out in parallel.

What is claimed is:

1. A character rendering device comprising:
an internal storage unit including a plurality of storage areas;
a first bus connected through an external bus to an external storage unit storing one or more character shape data sets, each of the one or more character shape data sets expressing a shape of a character;
a second bus connected to the internal storage unit;
a controller that specifies one of the plurality of storage areas;
a first rendering unit connected to the first and second buses, that renders a character shape of a character on a basis of one of the one or more character shape data sets, that is supplied through the external bus and the first bus, and writes through the second bus the rendered character shape into one of the plurality of storage areas specified by the controller;
a second rendering unit connected to the second bus, reads through the second bus, each time when writing of a character shape into one of the plurality of storage areas is completed by the first rendering unit, the character shape from one of the plurality of storage areas, and renders a character on a basis of the read character shape; and
a transfer unit that transfers the character rendered by the second rendering unit.

2. The character rendering device according to claim 1, wherein
the one or more character shape data sets are one or more outline font data sets,
the first rendering unit renders, as a character shape of a character, one or more contours forming a character on a basis of one of the one or more outline font data sets, and
the second rendering unit reads one or more contours forming a character from one of the plurality of storage areas, and renders the character by painting one or more areas surrounded by the read one or more contours.

3. A display device comprising:
the character rendering device according to claim 2; and
a display unit that displays the character transferred by the transfer unit.

4. A printing device comprising:
the character rendering device according to claim 2; and
a printing unit that prints the character transferred by the transfer unit.

5. The character rendering device according to claim 1, wherein
the one or more character shape data sets are one or more stroke font data sets,
the first rendering unit renders, as a character shape of a character, one or more center lines of one or more strokes forming a character on a basis of one of the one or more stroke font data sets, and
the second rendering unit reads one or more center lines one or more strokes forming a character from one of the plurality of storage areas, and renders the character by painting areas extending width-wise across the read one or more center lines.

6. A display device comprising:
the character rendering device according to claim 5; and
a display unit that displays the character transferred by the transfer unit.

7. A printing device comprising:
the character rendering device according to claim 5; and
a printing unit that prints the character transferred by the transfer unit.

8. The character rendering device according to claim 1, wherein
the one or more character shape data sets are one or more font data sets, each of the one or more font data sets expressing a shape of an entirety or a part of a character.

9. A display device comprising:
the character rendering device according to claim 8; and
a display unit that displays the character transferred by the transfer unit.

10. A printing device comprising:
the character rendering device according to claim 8; and
a printing unit that prints the character transferred by the transfer unit.

11. A display device comprising:
the character rendering device according to claim 1; and
a display unit that displays the character transferred by the transfer unit.

12. A printing device comprising:
the character rendering device according to claim 1; and
a printing unit that prints the character transferred by the transfer unit.

* * * * *